United States Patent [19]

Grünsch

[11] Patent Number: 4,694,240
[45] Date of Patent: Sep. 15, 1987

[54] SWITCHING REGULATOR

[75] Inventor: Eckhardt Grünsch, Allmersbach i.Tal, Fed. Rep. of Germany

[73] Assignee: ANT Nachrichtentechnik GmbH, Backnang, Fed. Rep. of Germany

[21] Appl. No.: 875,954

[22] Filed: Jun. 19, 1986

[30] Foreign Application Priority Data

Jun. 20, 1985 [EP] European Pat. Off. ........ 85 107614.1

[51] Int. Cl.⁴ .............................................. G05F 1/56
[52] U.S. Cl. .................... 323/285; 323/290
[58] Field of Search ............... 323/284, 285, 286, 290, 323/222; 363/21

[56] References Cited

U.S. PATENT DOCUMENTS 3,781,654 12/1973 Simcoe ................................. 323/290
3,790,878 2/1974 Brokaw ............................ 323/285 X
4,321,526 3/1982 Weischedel .......................... 323/286
4,442,339 4/1984 Mizuno et al. ................. 323/285 X
4,607,320 8/1986 Matui et al. ............................ 363/21

FOREIGN PATENT DOCUMENTS 2715571 10/1978 Fed. Rep. of Germany .

Primary Examiner—Peter S. Wong
Assistant Examiner—Marc S. Hoff
Attorney, Agent, or Firm—Spencer & Frank

[57] ABSTRACT

A switching regulator for supplying current to a load in order to maintain a selected voltage across the load. Current is supplied to the load from a coil which receives a train of spaced trapezoidal current pulses from an energy source. The spacing between current pulses is maintained constant while the duration of the current pulses is varied to compensate for changes tending to vary the load voltage.

5 Claims, 6 Drawing Figures

SWITCHING REGULATOR

BACKGROUND OF THE INVENTION

The present invention relates to a switching regulator operating with peak current regulation. A switching regulator of this type is disclosed in DE-OS [Federal Republic of Germany Laid-Open Application] No. 2,715,571.

In the switching regulator disclosed in DE-OS No. 2,715,571, the output voltage is regulated by varying the width of a constant frequency pulse or by varying the pulse frequency and keeping the pulse width constant. The regulating criterion is the peak current through the switching transistor. If there is a sudden change in load, this switching regulator requires several pulse periods to adjust to the load change. Moreover, the energy input time is limited to half of each pulse period.

SUMMARY OF THE INVENTION

It is an object of the present invention to provide a switching regulator of the above-described type which exhibits better dynamic behavior—particularly faster adjustment.

The above and other objects are achieved by improvements in a switching regulator for controlling the delivery of current to a load in order to establish a selected voltage across the load, which regulator includes energy supply means constituting a source of current, current storage means connected to be supplied with current by the energy supply means for supplying the load with current, controllable switch means connected to the energy supply means and the current storage means for controlling the supply of energy from the energy supply means to the current storage means and switchable between a first state in which energy is supplied by the energy supply means to the current storage means for charging the current storage means, and a second state in which energy is not supplied to the current storage means and the current storage means discharges, and regulating means connected to the switch means for switching the switch means between the first and second states in cycles, with each cycle being composed of a first period during which the switch means are in the first switching state and a second period during which the switch means are in the second switching state, for controlling the peak current supplied by the energy supply means in dependence on the load voltage. According to the invention, the means comprise timing control means connected for causing the second periods to all have the same duration, and the regulating means are operative for causing the first periods to have durations which vary in a manner to maintain the voltage across the load constant.

The switching regulator according to the present invention has the following advantages:

Compared to the switching regulator concept disclosed in DE-OS No. 2,715,571, the keying ratio is limited to T/2 (T=pulse period duration). With large sudden changes in load, energy follow-up is effected not in a maximum of T/2 steps but during only a single on-off cycle, thus regulating out such sudden changes in load more quickly. Interfering oscillations, which in the switching regulator according to DE-OS No. 2,715,571 occur for several periods due to the readjustment, do not occur.

Due to the constant energy output time, current hum, or ripple, d.c. premagnetization, the load current, and thus also the output voltage, remain constant in the face of fluctuations in input voltage. This means, particularly for a buck converter, a high adjustment factor for fluctuations in input voltage. Since the peak current through the switching transistor is proportional to the output current, current limitation for the switching transistor can simultaneously be the load current limitation. Separate load current evaluation as, for example, in the switching regulator according to European Pat. No. 27,847 B1 can be omitted.

If the storage choke is d.c. premagnetized, a change in the switching frequency takes place only as a function of fluctuations in the input voltage and depends on the input voltage range and, for a switching regulator without voltage transformation, on the selection of the keying ratio at the minimum input voltage. This is an advantage particularly compared to self-excited voltage transformers whose changes in switching frequency depend on input voltage and load.

The invention will now be described in greater detail with reference to the drawings.

DESCRIPTION OF THE PREFERRED EMBODIMENTS

Figure 1:
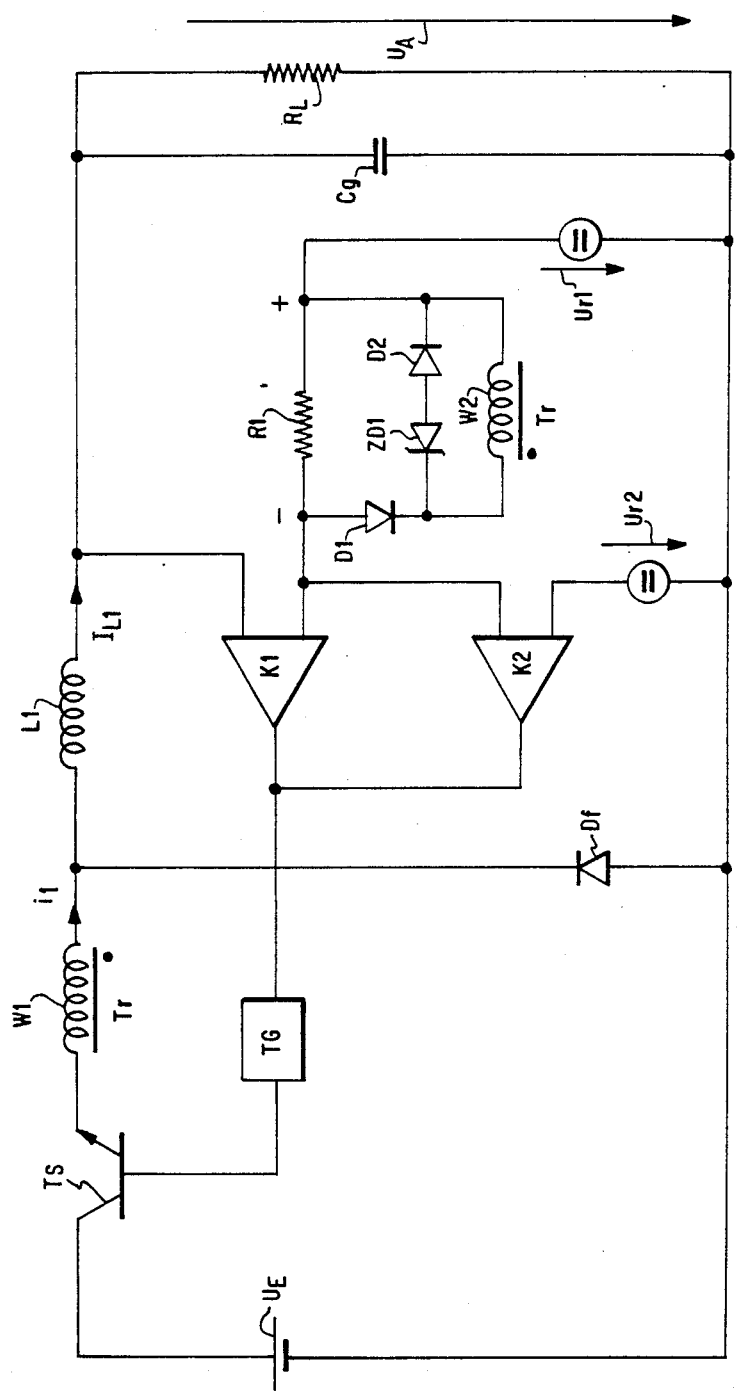
FIG. 1 is a basic circuit diagram for a switching regulator according to the present invention which operates according to the buck conversion principle.

FIG. 1 shows a switching regulator which operates according to the buck conversion principle. The input voltage source $U_E$ of the converter is connected to the output of the converter via the switching path of a switching transistor Ts and a storage choke L1. A smoothing capacitor Cg, to which is applied the output voltage $U_A$, is disposed at the output in parallel with output load $R_L$. Between the switching path of switching transistor Ts and storage choke L1, there is connected the primary winding w1 of a current transformer Tr. An idling diode Df is connected between the point of connection of primary winding w1 to storage choke L1 and the circuit common, or ground, connection, to which source $U_E$, capacitor Cg and load $R_L$ are also connected.

Switching transistor Ts is controlled by a clock pulse generator TG which itself is controlled by the output of a comparison stage K1. This comparison stage K1 has an inverting input connected to that end of load $R_L$ which leads to storage choke L1. Comparison stage K1 has a non-inverting input connected, via a series connection of a resistor R1 and a reference voltage source Ur1, to the other end of load $R_L$. Resistor R1 is connected to the secondary winding w2 of transformer Tr, via a diode network D1, ZD1, D2, ZD1 being a Zener diode, in such a manner that if current i₁ flows through switching transistor Ts, a voltage $U_{R1}$ of opposite polarity to the voltage across reference voltage source Ur1 is produced across resistor R1. The operation of the switching regulator shown in FIG. 1 will be described in greater detail below with reference to FIG. 2.

Figure 2:
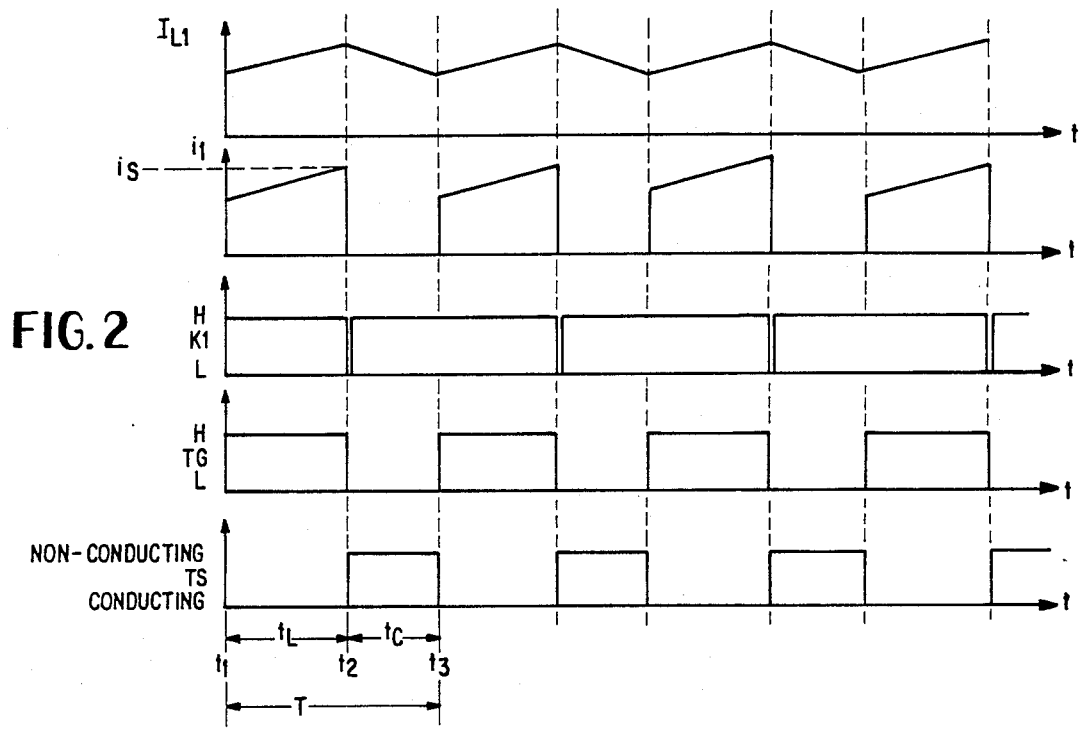
FIG. 2 are signal/time diagrams illustrating steady-state operation of the circuit of FIG. 1.

The signal curves shown in FIG. 2 apply for regulated operation. Regulation of the peak value $i_S$ of current i₁ by switching transistor Ts occurs in dependence on the output voltage $U_A$. For the case where output voltage $U_A$ is equal to reference voltage Ur1, no regulation takes place. Regulation does not begin until output voltage $U_A$ is less than reference voltage Ur1. The signal curves according to FIG. 2 also apply for the case where no sudden changes in load and input voltage occur.

Switching transistor Ts is closed, i.e. conducting, at time t₁=0. A current i1 flows from voltage source $U_E$ through switching transistor Ts, primary winding w1 of current transformer Tr and storage choke L1 to load $R_L$. At the same time, storage choke L1 is charged with current $I_{L1}$.

Via current transformer Tr, current i1 produces a voltage drop $U_{R1}$ across resistor R1, with this voltage drop being proportional to current i1. The non-inverting input of comparison stage K1 still has a more positive potential than the inverting input. The output of K1 therefore is at H (high) potential.

The voltage across resistor R1 progressively decreases so that the potential at the non-inverting input of K1 becomes more and more negative. As soon as the trapezoidal current i1, whose rise is essentially determined by the magnitude of the input voltage $U_E$ and by the inductance of the storage choke L1, has reached a value $i_S$, at time t₂, the potential at the non-inverting input of K1 becomes less positive than the potential at the inverting input. Comparison stage K1 now responds, i.e. its output jumps from H to L (low) potential and turns switching transistor Ts off via clock pulse generator TG. Thus, current value $i_S$ becomes the peak value of the current pulse preceding turn-off of transistor Ts.

In the embodiment of FIG. 1, clock pulse generator TG is configured as a monostable multivibrator. When the output of comparison stage K1 goes to L, the monostable multivibrator receives a trigger signal. Its output jumps from H to L and turns off switching transistor Ts. Once switching transistor Ts is switched off, there no longer occurs a voltage drop across resistor R1 since current no longer flows through current transformer Tr. Only the reference voltage Ur1 is then present at the non-inverting input of K1.

Since during regulating operation this reference voltage Ur1 is greater than output voltage $U_A$, the non-inverting input of K1 quickly becomes more positive again than the inverting input and the output signal of comparison stage K1 jumps back to H potential. The output of the monostable multivibrator however, remains at L potential for a fixed period of time $t_c$ which remains constant for every switching cycle. When the switching transistor Ts is turned off, circuit operation is in the energy discharge phase in that the load current is generated by discharge of choke L1 and flows via idling diode $D_f$. Only at the end of time $t_c$, given by the time constant of the monostable multivibrator, a new energy intake phase begins at time t₃. At this time, the output potential of the monostable multivibrator changes from L to H and the switching transistor Ts is switched on again.

Without additional voltage transformation, the following relationships apply for the keying ratio $t_L/T$ ($t_L$=duration of energy intake phase; T=(duration of one cycle=$t_L+t_c$):

$$(U_E-U_A)t_L = U_A(T-t_L)$$

where $T-t_L=t_C$=constant. Consequently, $$t_L/T = U_A/U_E$$

Thus, the keying ratio is not limited to a maximum of ½ as in the switching regulator according to DE-OS No. 2,715,571. If voltage transformation is employed between input and output voltage, any desired keying ratio can be selected. Otherwise, the keying ratio must be adapted to the ratio of input voltage to output voltage. The keying ratio is selected in such a manner that regulating operation is still possible at the minimum occurring input voltage $U_E$.

Figure 3A:
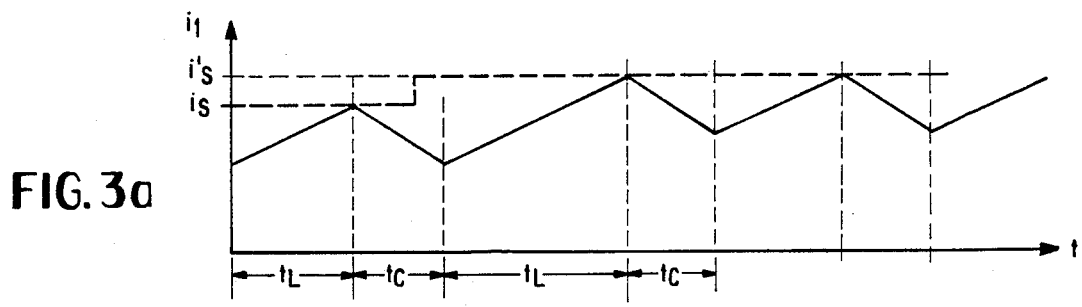
FIGS. 3a and 3b are signal/time diagrams illustrating response of the circuit to changes in load and input voltage, respectively.

The regulating behavior of the switching regulator during sudden changes in load and input voltage will now be described with reference to FIG. 3. The time diagram of FIG. 3a assumes a sudden change in load to have occurred, e.g. a reduction of the resistance of load $R_L$.

For this sudden change in load, the energy intake current i₁ must rise from the previous peak value $i_S$ to a higher peak value $i_S'$. This is now accomplished in that the energy intake time $t_L$ is extended until the trapezoidal current i₁ has reached the higher value $i_S'$ with the same rise, at which $i_S'$ is the new peak value on which the comparator stage K1 is changed. The energy discharge time $t_c$, however, is kept constant as before, because the clock pulse generator TG has a constant switch time (monoflop).

The increase of the energy intake time $t_L$ is a result of a decrease in $U_A$ with a reduction of $R_L$. Thereby the switching threshold of the comparison stage K1 is altered. The voltage $U_A$ takes the new value $U_{r1}$ minus voltage drop $U_{R1}$ (FIG. 1).

Readjustment as a result of such a sudden change in load takes place within a single period, i.e. all of the added energy required for the greater load is taken in during the first full period after the load change. Regulating oscillations over several periods, as they occur in other switching regulators, are eliminated. The extension of the energy intake time with a constant energy discharge time $t_c$ is synonymous with a reduction in switching frequency of the switching regulator.

Figure 3B:
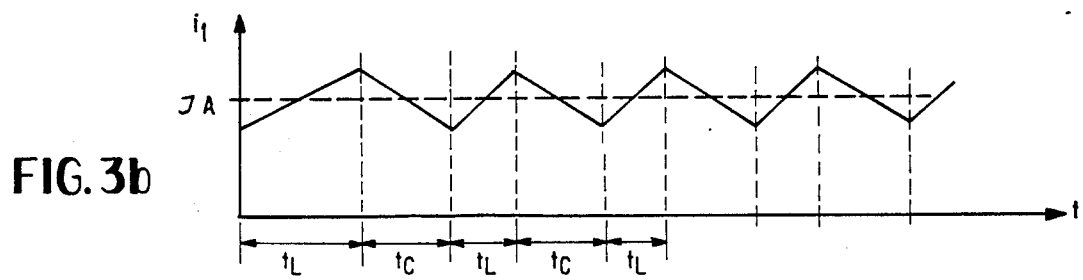

In the diagram of FIG. 3b, a sudden change in input voltage $U_E$ has been assumed, i.e. from a lower value to a higher value. During the first switching cycle, input voltage $U_E$ is low. Such a low input voltage $U_E$ is associated with a flat rise in current i₁. Since with a higher input voltage $U_E$, the energy discharge time $t_c$ remains constant and the rise of current i₁ is steeper, and the same average current value $J_A$ is to be realized, the conductive period $t_L$ must become shorter. The constant energy discharge time $t_c$ continues to be fixed by the time constant of the monostable multivibrator TG.

Since the peak current $i_S$ through switching transistor Ts is proportional to the load current, limitation of the collector current of switching transistor Ts can simultaneously be used to limit the load current. A second comparison stage K2 is provided to limit the collector and load currents and the non-inverting input of this comparison stage K2 is connected to the non-inverting input of the first comparison stage K1. The inverting input of K2 is charged with a second reference voltage Ur2. The output of K2 is connected, like the output of K1, to the input of monostable multivibrator TG. Reference voltage Ur2 is selected to have a value less than the value of output voltage $U_A$ and less than the value of the first reference voltage Ur1 so that the second comparison stage K2 responds to turn off TG only if a relatively large collector current flows through switching transistor Ts against which the connected load or switching transistor Ts, respectively, must be protected.

Thereby does a L value at the output of K2 nullify the H value appearing at the output of K1, because the comparator stages K1 and K2 have open collectors.

Figure 4:
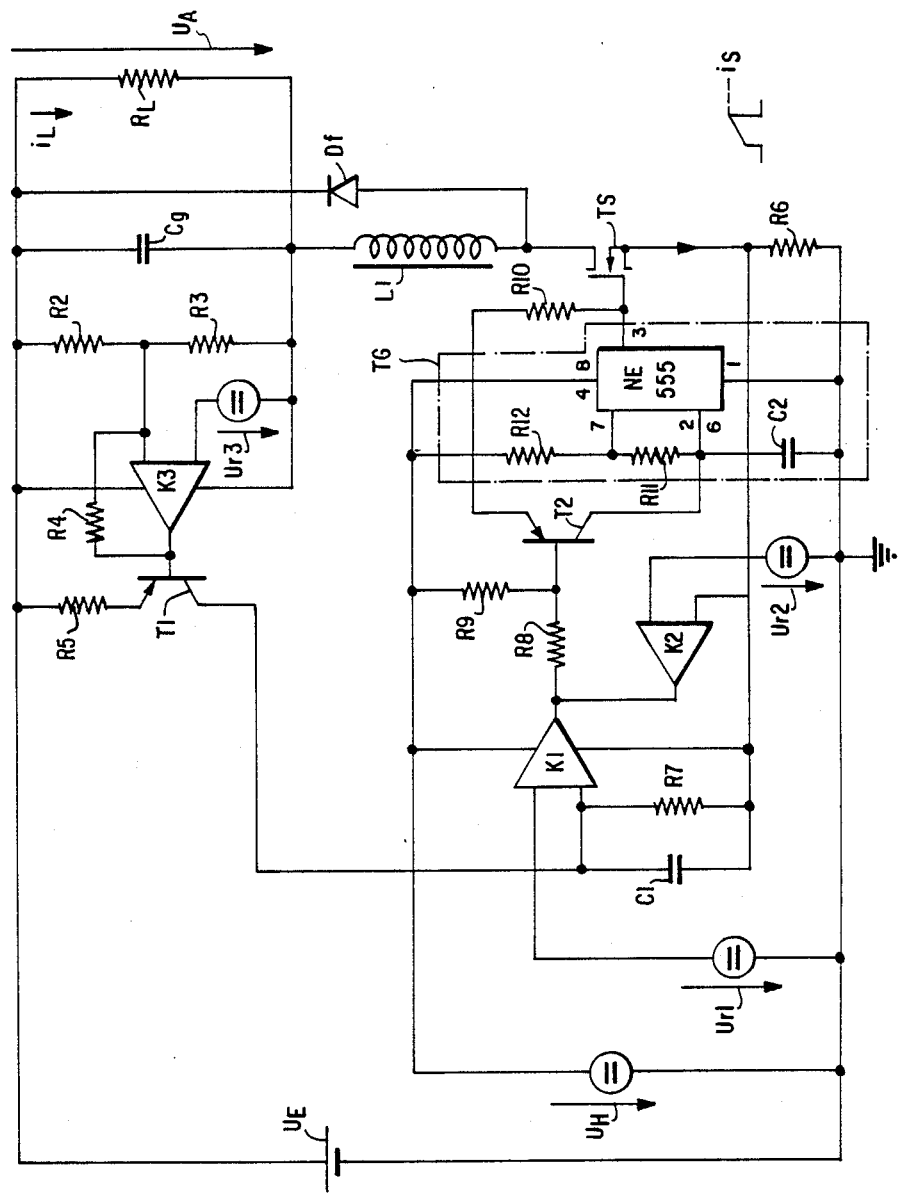
FIG. 4 is a basic circuit diagram for a modified switching regulator according to the invention including a regulating amplifier.

In the embodiment of FIG. 4, in contradistinction to the embodiment of FIG. 1, the output voltage $U_A$ is regulated by way of a regulating amplifier including resistors R2, R3, R4 and R5, amplifier stage K3 and subsequent transistor amplifier stage T1. In the case where the voltage drop across resistor R3 becomes greater than a reference voltage Ur3, amplifier stage K3 operates as a linear amplifier including a feedback resistor R4. The first comparison stage K1 is connected somewhat differently than in FIG. 1. A reference voltage source Ur1 of, for example, 6.2 V, is connected to the non-inverting input of K1.

The current through switching transistor Ts, which is here a field effect transistor, is monitored with the aid of a series connected current measuring resistor R6. The output of transistor amplifier stage T1 is connected to the inverting input of K1, which is also connected to a parallel connection of a resistor R7 and a capacitor C1. A voltage drop proportional to output voltage $U_A$ develops across resistor R7. Capacitor C1 integrates, and smooths, the output voltage hum. Current measuring resistor R6 is connected in series with the parallel connection of R7 and C1, so that the peak current $i_S$ can be regulated as a function of output voltage $U_A$.

The output of comparison stage K1 is connected, via a transistor amplifier stage including transistor T2 and resistors R8, R9 and R10, to clock pulse generator TG which controls the conduction state of switching transistor Ts. This clock pulse generator TG is here composed of a freely oscillating square wave oscillator formed of an integrated circuit NE 555 whose oscillating frequency is fixed by the time constant of RC member R11, C2. After comparison stage K1 or transistor stage T2 responds, the freely oscillating oscillator is forced into monostable behavior, i.e. after comparison stage K1 responds, the oscillator controls switching transistor Ts to be non-conductive for a constant time period.

The operation of the circuit according to FIG. 4, insofar it differs from the operation of the circuit according to FIG. 1, will now be explained. Square wave oscillator TG is set via resistors R11 and R12 and capacitor C2, with respect to its keying ratio and its free oscillation frequency, as disclosed in Signetics, Lineare Integrierte Schaltungen [Linear Integrated Circuits] 1972, pages 173–177.

Figures 5, 6:
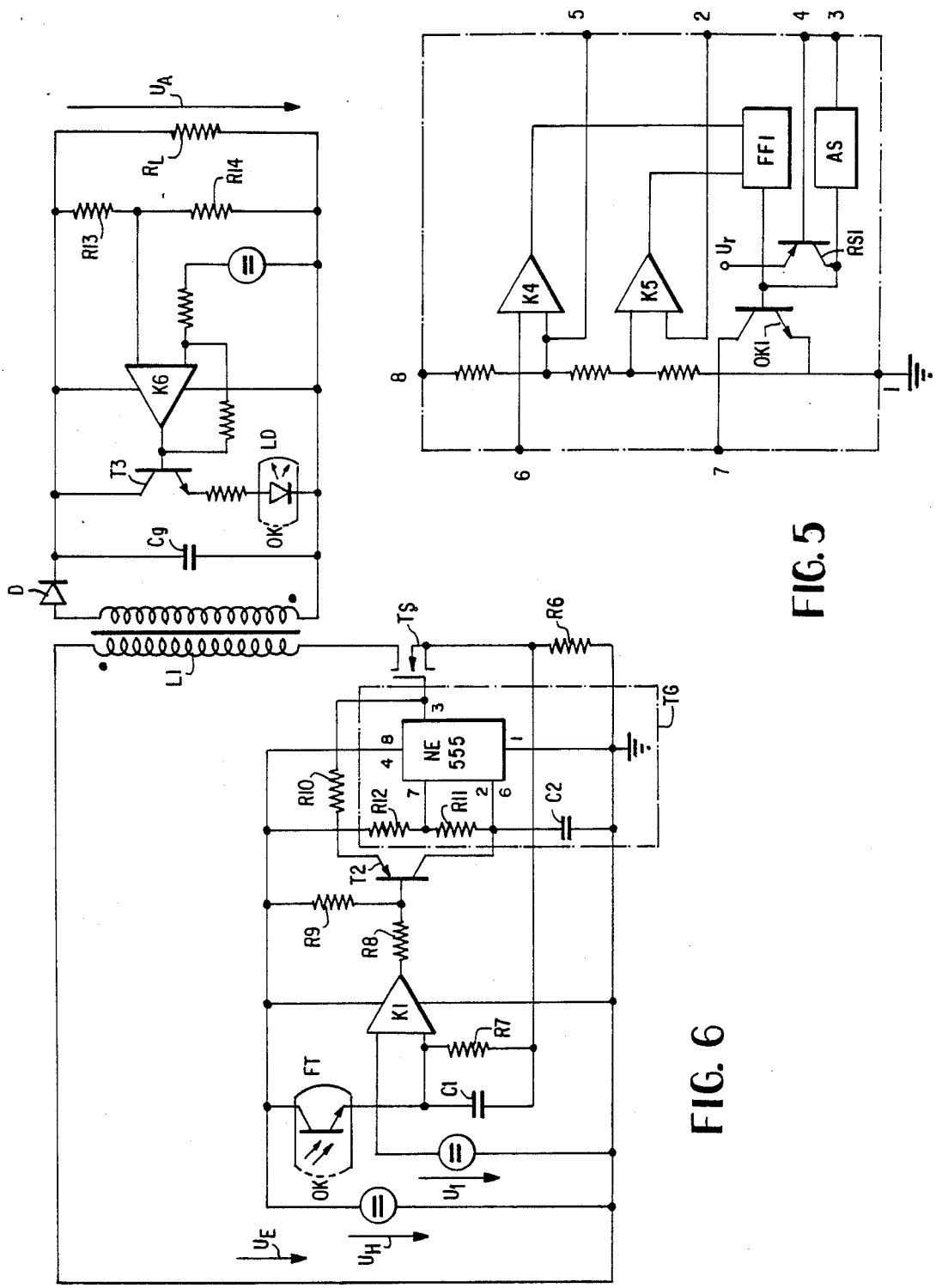
FIG. 5 shows an embodiment of the oscillator module of the circuit of FIG. 4.
FIG. 6 is a basic circuit diagram for a switching regulator according to the invention operating according to the flyback converter principle.

The internal configuration of switching circuit NE 555 is shown in FIG. 5. It is composed of two comparators K4, K5, a flip-flop FF1, an output stage AS, an open collector transistor stage OK1 and a reset stage RS1, as well as three voltage divider resistors, as described in (Signetics, supra, page 173). The maximum period of conduction $t_L$ of switching transistor Ts is fixed by the following relationship:

$$t_{L\ max} = 0.685\ (R11 + R12)\ C2$$

and the constant energy discharge time is fixed by the following relationship:

$$t_c = 0.685 \cdot R11 \cdot C2.$$

The frequency of oscillator TG in the uninfluenced state results as follows:

$$f = \frac{1.46}{(R11 + R12)\ C2}$$

Oscillator TG switches switching transistor Ts at this frequency until output voltage $U_A$ has risen to such an extent that regulating analog amplifier K3, T1 begins to operate; i.e. the reduced output voltage $U_A$ at the center tap of divider R2, R3 is higher than reference voltage Ur3. The regulating analog amplifier K3, T1 has the function of reducing the change in $U_A$ across $R_L$.

With switching transistor Ts switched through, i.e. conducting, an energy intake current $i_1$ proportional to load current $i_L$ flows through storage choke L1 and current measuring resistor R6. As soon as the voltage drop across current measuring resistor R6 becomes large enough that the following relationship applies:

$$U_{R6} + U_{R7} > Ur1,$$

the output of comparison stage K1 switches to low potential and actuates transistor stage T2. Now a current flows from power output 3 of circuit NE 555 through resistor R10, the emitter-collector path of transistor T2 and capacitor C2. Capacitor C2 is thus charged relatively quickly to a voltage of, e.g., $\frac{2}{3}\ U_H$ which constitutes the upper switching point of circuit NE 555. At the upper switching point the output of circuit NE 555 has the value L and the switching transistor $T_s$ is non-conducting. At the lower switching, which is defined at $\frac{1}{3}\ U_H$, the output of circuit NE 555 corresponding has the value H.

Once this voltage of $\frac{2}{3}\ U_H$ is reached, the power output 3 switches to a low voltage and blocks switching transistor Ts. In this way, rectangular oscillator TG is forced into monostable behavior.

Now follows the phase of constant energy discharge time $t_c$ during which the storage choke L1 continues as before to give its energy via idling diode Df to load $R_L$. During the constant energy discharge time, output 3 remains at low potential. Current is now unable to flow through the resistor R10 and the emitter-collector path of T2 to the trigger, or threshold value, input 2,6 of circuit NE 555. Thus capacitor C2 discharges via resistor R11 during time $t_c$ from a voltage value of $\frac{2}{3}\ U_H$ to a voltage value of $\frac{1}{3}\ U_H$. When the voltage across capacitor C2 has reached the value of $\frac{1}{3}\ U_H$, the lower switching threshold of circuit NE 555 will have been reached, its output 3 jumps to a high potential and switches switching transistor Ts back on.

The time at which clock pulse generator TG changes to monostable operation is determined by the variation which is to be compensated by the regulation process, i.e. the load and the magnitude of the input voltage $U_E$, respectively. This is evident as before by a shortening or lengthening of the energy intake phase, whereas the energy discharge time $t_c$ remains constant. As a whole, changes in input voltage result in a change in the frequency of the switching regulator. As in the embodiment according to FIG. 1, the collector current of switching transistor Ts and thus the load current can be limited by comparison stage K2.

In FIG. 4 the input connections to comparison stage K2 differ from those of FIG. 1, because of the different polarities of the voltage drop across R6 in FIG. 4 and the voltage drop across R1 in FIG. 1.

The switching regulator according to FIG. 6 operates according to the flyback converter principle with galvanic, i.e. conductive, separation by the voltage converting storage choke L1, which here is composed of two inductively coupled windings. The output voltage $U_A$ is here detected via a voltage divider R13, R14. As soon as a potential proportional to output voltage $U_A$ at the non-inverting input exceeds the potential at the inverting output of a comparison stage K6, the output of K6 turns on a transistor T3 and a current is driven through the light emitting diode LD of a photocoupler OK. A phototransistor FT in this optocoupler OK generates, analogously to transistor T1 of FIG. 4, a voltage drop across the resistor/capacitor circuit C1, R7 which, together with the voltage drop across current measuring resistor R6, becomes effective at the inverting input of comparison stage K1. Switching transistor Ts is controlled, corresponding to the embodiment of FIG. 4, via the output of K1, transistor stage T2 and clock pulse generator TG with the difference that the mode of operation is modified for a flyback converter. In connection with a flyback converter, there again results the advantage that the keying ratio is not limited to T/2 and can be selected within a range of $t_L/T = 0 - 0.95$.

It will be understood that the above description of the present invention is susceptible to various modifications, changes and adaptations, and the same are intended to be comprehended within the meaning and range of equivalents of the appended claims.

What is claimed is:

1. In a switching regulator for controlling the delivery of current to a load in order to establish a selected voltage across the load, which regulator includes energy supply means constituting a source of current, current storage means connected to be supplied with current by the energy supply means for supplying the load with current, controllable switch means connected to the energy supply means and the current storage means for controlling the supply of energy from the energy supply means to the current storage means and switchable between a first state in which energy is supplied by the energy supply means to the current storage means for charging the current storage means, and a second state in which energy is not supplied to the current storage means and the current storage means discharges, and regulating means connected to the switch means for switching the switch means between the first and second states in cycles, with each cycle being composed of a first period during which the switch means are in the first switching state and a second period during which the switch means are in the second switching state, the improvement wherein said regulating means comprise means for monitoring the peak current supplied by the energy supply means during each first period and for controlling the peak current supplied by the energy supply means in dependence on the load voltage, and timing control means connected to said means for monitoring and controlling for causing the second periods to all have the same duration and, for causing the first periods to have durations which vary in a manner to maintain the voltage across the load constant.

2. A regulator as defined in claim 1 wherein said regulating means comprise comparator means connected to effect a comparison between a first signal representative of the load voltage and a second signal representative of a function of the peak current supplied by said energy supply means and a reference voltage and to produce an output signal when the first and second signals have a predetermined relationship, and said timing control means comprise a pulse generator connected between said comparator means and said switch means for placing said switch means in the second state for a second period in response to each output signal produced by said comparator means.

3. A regulator as defined in claim 2 wherein said regulating means comprise peak current limiting means connected to said timing control means for limiting the peak current supplied by said energy supply means to a selected maximum value.

4. A regulator as defined in claim 1 wherein said reguliting means comprise comparator means connected to effect a comparison between a reference signal and a further signal representative of a function of the peak current supplied by said energy supply means and the load voltage to produce an output signal when the comparison signal and further signal have a predetermined relationship, and said timing control means comprise a pulse generator connected between said comparator means and said switch means for placing said switch means in the second state for a second period in response to each output signal produced by said comparator means.

5. A regulator as defined in claim 4 wherein said regulating means comprise peak current limiting means connected to said timing control means for limiting the peak current supplied by said energy supply means to a selected maximum value.

* * * * *